(12) United States Patent
Ichinose et al.

(10) Patent No.: US 8,694,171 B2
(45) Date of Patent: Apr. 8, 2014

(54) WIND-TURBINE-GENERATOR CONTROL SYSTEM, WIND FARM, AND WIND-TURBINE-GENERATOR CONTROL METHOD

(75) Inventors: Hidekazu Ichinose, Tokyo (JP); Tsuyoshi Wakasa, Tokyo (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 0 days.

(21) Appl. No.: 13/027,320

(22) Filed: Feb. 15, 2011

(65) Prior Publication Data

US 2011/0187106 A1    Aug. 4, 2011

Related U.S. Application Data

(63) Continuation of application No. PCT/JP2010/069318, filed on Oct. 29, 2010.

(60) Provisional application No. 61/409,608, filed on Nov. 3, 2010.

(51) Int. Cl.
*G05D 11/00* (2006.01)
(52) U.S. Cl.
USPC .............................. 700/287; 290/44; 361/20
(58) Field of Classification Search
USPC .............................. 700/287; 290/44; 361/20
See application file for complete search history.

(56) References Cited

U.S. PATENT DOCUMENTS

| | | | |
|---|---|---|---|
| 7,531,911 B2 | 5/2009 | Rivas et al. | |
| 7,638,839 B2 | 12/2009 | Arai et al. | |
| 7,679,215 B2 | 3/2010 | Delmerico et al. | |
| 2006/0132993 A1* | 6/2006 | Delmerico et al. | 361/20 |
| 2007/0108769 A1 | 5/2007 | Wobben | |
| 2008/0150283 A1* | 6/2008 | Rivas et al. | 290/44 |
| 2008/0247872 A1* | 10/2008 | Akcasu | 416/41 |

(Continued)

FOREIGN PATENT DOCUMENTS

| | | |
|---|---|---|
| CN | 1784544 A | 6/2006 |
| JP | 6276584 | 9/1994 |

(Continued)

OTHER PUBLICATIONS

Sorensen, Poul et al. "Wind Farm Control: Experience from a 160 MW wind farm" ECPE Seminar—Renewable Energies. Kassel Feb. 9-10, 2006.

(Continued)

*Primary Examiner* — Mohammad Ali
*Assistant Examiner* — Anthony Whittington
(74) *Attorney, Agent, or Firm* — Benjamin J. Hauptman; Manabu Kanesaka (57) ABSTRACT

A wind-turbine control system is provided for each of a plurality of wind turbine generators constituting a wind farm, sends wind-turbine data about a controlled wind turbine generator to the wind-turbine control systems provided for the other wind turbine generators, and receives wind-turbine data about the other wind turbine generators from the wind-turbine control systems provided for the other wind turbine generators. Then, the wind-turbine control system controls the controlled wind turbine generator based on the wind-turbine data about the controlled wind turbine generator and the wind-turbine data about the other wind turbine generators. Therefore, the control of the wind turbine generators constituting the wind farm can be changed more swiftly according to the operational condition of the wind farm.

2 Claims, 9 Drawing Sheets

(56) References Cited

U.S. PATENT DOCUMENTS

| 2009/0079267 | A1 | 3/2009 | Korba et al. | |
|---|---|---|---|---|
| 2010/0094474 | A1* | 4/2010 | Larsen et al. | 700/287 |
| 2010/0138058 | A1* | 6/2010 | Kirchner et al. | 700/286 |

FOREIGN PATENT DOCUMENTS

| JP | 200087841 | 3/2000 |
|---|---|---|
| JP | 200936210 | 2/2009 |
| JP | 2010084545 | 4/2010 |
| JP | 4470933 | 6/2010 |
| JP | 2010127235 | 6/2010 |
| JP | 2010130762 | 6/2010 |
| JP | 2010178468 | 8/2010 |

OTHER PUBLICATIONS

International Search Report for PCT/JP2010/069318 mailed Nov. 30, 2010.

Decision to Grant a Patent for Korean Patent Application No. 10-2011-7007458 issued on Mar. 4, 2013.

Decision to Grant as issued on Jul. 22, 2013 in Canadian Patent Application No. 2730658.

Decision to grant a patent mailed Nov. 12, 2013, corresponds to Japanese patent application No. 2011-506278.

Office Action dated Dec. 24, 2013, corresponds to Chinese patent application No. 201080002810.0.

* cited by examiner

WIND-TURBINE-GENERATOR CONTROL SYSTEM, WIND FARM, AND WIND-TURBINE-GENERATOR CONTROL METHOD

CROSS REFERENCE TO RELATED APPLICATIONS

This is a continuation of International Application PCT/JP2010/069318, with an international filing date of Oct. 29, 2010, which is hereby incorporated by reference herein in its entirety. This application claims the benefit of U.S. Provisional Application No. 61/409,608, filed on Nov. 3, 2010, the content of which is incorporated herein by reference.

TECHNICAL FIELD

The present invention relates to a wind-turbine-generator control system, a wind farm, and a wind-turbine-generator control method.

BACKGROUND ART

In recent years, wind farms that are composed of a plurality of wind turbine generators and that supply power to a utility grid have become widespread.

Power supplied from such wind farms varies depending on wind conditions. Therefore, output-power limitation, ramp-rate control, reactive-power control, and frequency control are known ways of controlling the wind turbine generators for stabilization in the utility grid.

As described in NPL 1, these controls with respect to the wind turbine generators are realized when a wind farm controller performs a comparison operation for data about the wind turbine generators and measurement data of power, voltage, frequency, power factor, and the like that are supplied from the wind turbine generators to the utility grid, at a connecting point (hereinafter, referred to as "grid connecting point") between the wind turbine generators constituting the wind farm and the utility grid, and sends various command values to the wind turbine generators.

Figure 9:
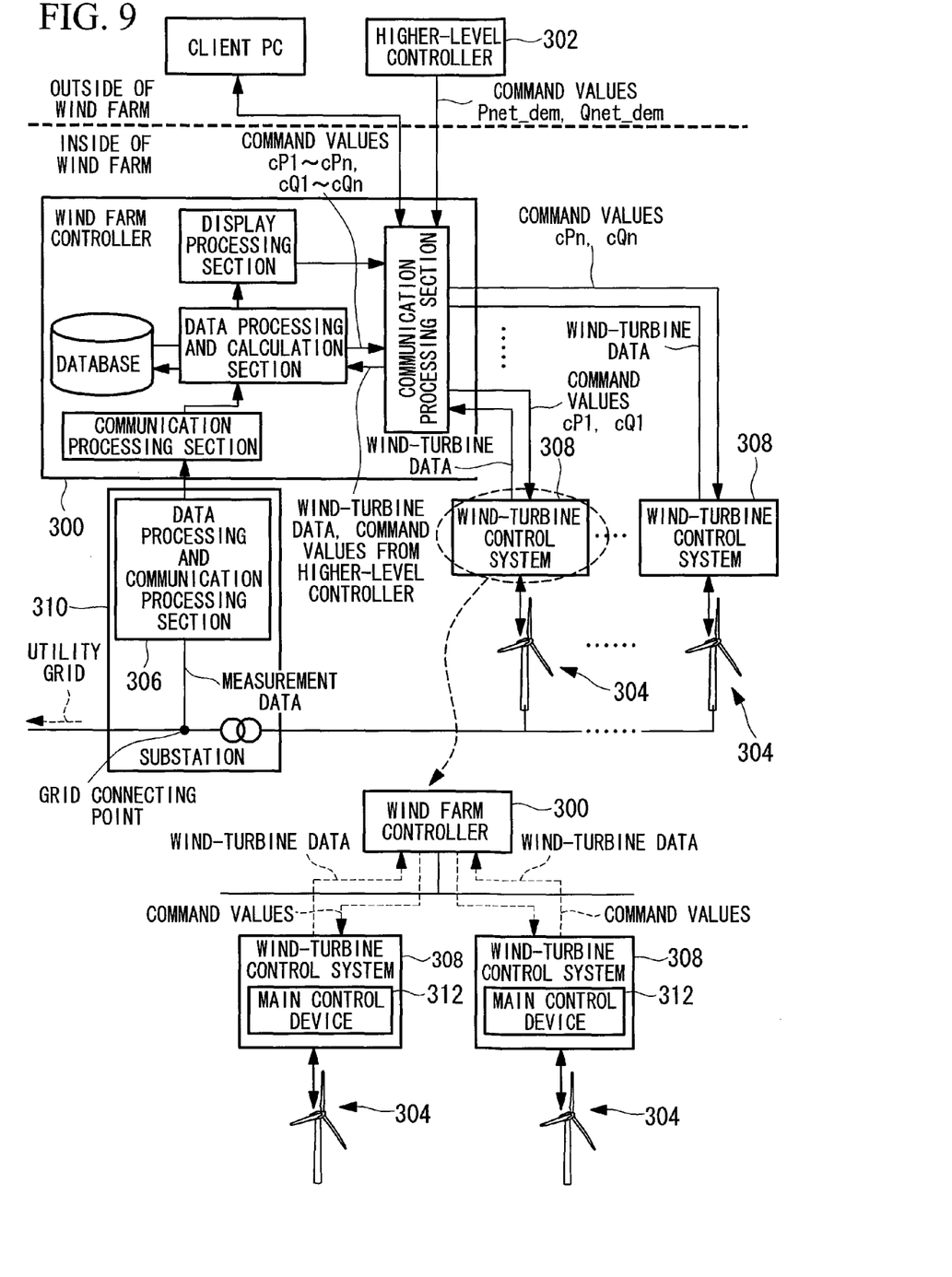
FIG. 9 is a diagram for explaining data flows between wind-turbine control systems and a wind farm controller in a conventional wind farm.

Data flows between the wind turbine generators and the wind farm controller in a conventional wind farm will be described in more detail with reference to FIG. 9. The upper part of FIG. 9 is an overall diagram, and the lower part of FIG. 9 is a configuration diagram of a conventional wind-turbine control system.

From a higher-level controller 302 provided, for example, in an electric power company, a wind farm controller 300 receives command values Pnet_dem and Qnet_dem that indicate the target values of the amount of active power and the amount of reactive power for the wind farm as a whole. Furthermore, the wind farm controller 300 receives measurement data that indicates the active power, the reactive power, the voltage, and the frequency at the grid connecting point, detected by a data processing and communication processing section 306 included in a substation 310, and receives wind-turbine data about each wind turbine generator 304 via a wind-turbine control system 308 provided for each wind turbine generator 304. The wind-turbine data indicates, for example, the frequency of power output from the wind turbine generator 304, voltage, current, active power, reactive power, power factor, blade pitch angle, rotor rotational speed, operation mode, wind speed, wind direction, hydraulic pressure, temperature, load imposed on predetermined equipment, the presence or absence of abnormalities in various sensors, warnings, other operational statuses, and the like.

Then, the wind farm controller 300 calculates command values (such as a grid-active-power command value cP and a grid-reactive-power command value cQ) for the wind turbine generator 304, with respect to all of the wind turbine generators 304 constituting a wind farm 310, based on the command values sent from the higher-level controller 302 and based on the various data received, and sends the calculated command values to the wind-turbine control systems 308 provided for the respective wind turbine generators 304. Then, each of the wind-turbine control systems 308 controls the controlled wind turbine generator 304 by using a main control device 312 included in the wind-turbine control system 308, based on the received command values.

CITATION LIST

Patent Literature

{PTL 1} The specification of U.S. Pat. No. 7,679,215
{PTL 2} The specification of U.S. Pat. No. 7,638,839
{PTL 3} The specification of U.S. Pat. No. 7,531,911
{PTL 4} The specification of U.S. Patent Application, Publication No. 2010/0138058
{PTL 5} The specification of U.S. Patent Application, Publication No. 2010/0094474
{PTL 6} Publication of Japanese Patent No. 4470933
{PTL 7} Japanese Unexamined Patent Application, Publication No. 2010-178468
{PTL 8} Japanese Unexamined Patent Application, Publication No. 2010-130762
{PTL 9} Japanese Unexamined Patent Application, Publication No. 2010-84545

Non Patent Literature

{NPL 1} Poul Sorensen and two others, "WIND FARM CONTROL, Experience from a 160 MW wind farm", [online] Feb. 9 to 10, 2006, ECPE Seminar Renewable Energies, [retrieved on Aug. 25, 2010], Internet <URL:http://www.univ-lehavre.fr/recherche/greah/documents/ecpe/sorensen.pdf>

SUMMARY OF INVENTION

Technical Problem

For example, when the utility-grid frequency (hereinafter, referred to as "grid frequency") decreases, the operation mode of the wind turbine generator 304 is switched, and the wind turbine generator 304 is controlled so as to further supply power for recovering the decreased grid frequency to the utility grid. Specifically, when the grid frequency decreases, the wind turbine generator 304 is switched to an operation mode in which more power than usual is supplied to the utility grid. Switching to this operation mode needs to be performed in a short time (in a few seconds) after the decrease of the grid frequency, to swiftly recover from the decreased grid frequency. In addition, when some of the wind turbine generators 304 constituting the wind farm 310 have breakdowns or when the wind conditions change, the control of the wind turbine generators 304 needs to be changed swiftly, in some cases, in order to stably supply power.

In the above-described conventional control method, however, since the wind farm controller 300 generates all command values for controlling the plurality of wind turbine generators 304, it takes time to generate the command values in the wind farm controller 300 in a case where the wind farm 310 is composed of a large number of wind turbine generators 304, such as several tens of or a hundred and several tens of wind turbine generators 304. Further, although each wind-turbine control system 308 sends the wind-turbine data about the corresponding wind turbine generator 304 to the wind farm controller 300, the wind farm controller 300 receives the data in sequence one by one, thus causing a time delay in the wind-turbine data. Therefore, in conventional control with respect to the wind turbine generators, the control of the wind turbine generators 304 constituting the wind farm 310 is not changed swiftly, in some cases.

The present invention has been made in view of these circumstances, and an object thereof is to provide a wind-turbine-generator control system, a wind farm, and a wind-turbine-generator control method that are capable of more swiftly changing control of wind turbine generators constituting a wind farm according to the operational condition of the wind farm.

Solution to Problem

In order to solve the above-described problems, the wind-turbine-generator control system, the wind farm, and the wind-turbine-generator control method of the present invention employ the following solutions.

According to a wind-Lurbine-generator control system of a first aspect of the present invention, there is provided a control system provided for each of a plurality of wind turbine generators constituting a wind farm, the control system including: a transmission part for transmitting data about a controlled wind turbine generator among the plurality of wind turbine generators to the other wind turbine generators; a reception part for receiving data about the other wind turbine generators transmitted from the other wind turbine generators; and a control part for controlling the controlled wind turbine generator based on the data about the controlled wind turbine generator and the data about the other wind turbine generators received by the reception part.

According to the present invention, the control system is provided for each of the plurality of wind turbine generators constituting the wind farm, and the transmission part included in the control system sends data about the controlled wind turbine generator to the other wind turbine generators, and the reception part included therein receives data about the other wind turbine generators.

As a result, the control systems provided for each of the plurality of wind turbine generators share the data about the other wind turbine generators constituting the wind farm. Data about the wind turbine generator indicates the frequency of power output from he wind turbine generator, voltage, current, active power, reactive power, power factor, blade pitch angle, rotor rotational speed, operation mode, wind speed, wind direction, hydraulic pressure, temperature, load imposed on predetermined equipment, the presence or absence of abnormalities in various sensors, warnings, other operational statuses, and the like. That is, the data about the wind turbine generator indicates the operational condition of the wind turbine generator.

Then, the control part controls the controlled wind turbine generator based on the data about the controlled wind turbine generator and the data about the other wind turbine generators received by the reception part. Therefore, the control part controls the controlled wind turbine generator according to the operational condition of the other wind turbine generators, in other words, the operational condition of the wind farm. Further, since the control system is provided for each of the wind turbine generators, control of the wind turbine generators is unlikely to be delayed.

As described above, each of the wind turbine generators constituting the wind farm is individually controlled by the control system provided therefor, based on data about itself and data about the other wind turbine generators. Therefore, according to the present invention, control of the wind turbine generators constituting the wind farm can be changed more swiftly according to the operational condition of the wind farm.

Furthermore, in the control system of the present invention, the plurality of wind turbine generators may be grouped into a plurality of groups based on a predetermined criterion; the reception part may receive data about the other wind turbine generators that belong to a group to which the controlled wind turbine generator belongs; and the control part may control the controlled wind turbine generator based on the data about the controlled wind turbine generator and the data about the other wind turbine generators that belong to the group to which the controlled wind turbine generator belongs, received by the reception part.

According to the present invention, the plurality of wind turbine generators are grouped into a plurality of groups based on a predetermined criterion. The predetermined criterion is the locations where the wind turbine generators are installed, the wind speed, or the presence or absence of breakdowns in the wind turbine generators.

Then, the reception part receives data about the other wind turbine generators belonging to the group to which the controlled wind turbine generator belongs.

Thus, the control part controls the controlled wind turbine generator based on information about the other wind turbine generators belonging to the group to which the controlled wind turbine generator belongs; therefore, according to the present invention, control of the wind turbine generators constituting the wind farm can be changed more swiftly and efficiently.

Furthermore, in the control system of the present invention, the criterion may be able to be changed according to wind conditions or operational states of the plurality of wind turbine generators.

According to the present invention, the criterion for grouping the plurality of wind turbine generators into a plurality of groups can be changed according to the wind conditions or the operational condition of the wind turbine generators; therefore, wind turbine generators to be grouped can be changed according to the condition of the wind farm, and control of the wind turbine generators constituting the wind farm can be changed more efficiently.

A case where groups are changed is, for example, a case where a breakdown occurs in the wind turbine generators, a case where the wind conditions change, or other cases.

Furthermore, in the control system of the present invention, the data about the plurality of wind turbine generators may contain a wind speed and a wind direction at each of the plurality of wind turbine generators; and the control part may generate a distribution of at least one of the wind direction and the wind speed in the wind farm, from the data about the controlled wind turbine generator and the data about the other wind turbine generators received by the reception part, and may control the controlled wind turbine generator based on the generated distribution.

According to the present invention, the controlled wind turbine generator is controlled based on the distribution of at least one of the wind direction and the wind speed in the wind farm, generated from the data about the wind turbine generators; therefore, control of the wind turbine generators can be changed more swiftly according to the ever-changing wind conditions in the wind farm.

Furthermore, according to the present invention, there is provided a wind farm including a plurality of wind turbine generators that are each provided with the control system described above.

According to the present invention, the plurality of wind turbine generators constituting the wind farm are each provided with the above-described control system; therefore, control of the wind turbine generators constituting the wind farm can be changed more swiftly according to the operational condition of the wind farm.

Furthermore, in the wind farm of the present invention, a management device that manages data about the plurality of wind turbine generators may be further included, and the transmission part included in a predetermined control system, among the control systems provided for the plurality of wind turbine generators, may transmit, to the management device, the data about a wind turbine generator controlled by the predetermined control system and the data about the other wind turbine generators received by the reception part.

According to the present invention, since the management device receives data about the wind turbine generators from a predetermined control system, it is not necessary to receive the data about the wind turbine generators from all of the plurality of wind-turbine-generator control systems constituting the wind farm. Therefore, according to the present invention, the processing load of transmission and reception of various data in the management device can be reduced.

Furthermore, according to the present invention, there is provided a wind-turbine-generator control method that is performed in a control system provided for each of a plurality of wind turbine generators constituting a wind farm, the method including: a first step of transmitting data about a controlled wind turbine generator among the plurality of wind turbine generators to the other wind turbine generators and of receiving data about the other wind turbine generators transmitted from the other wind turbine generators; and a second step of controlling the controlled wind turbine generator based on the data about the controlled wind turbine generator and the received data about the other wind turbine generators.

According to the present invention, each of the wind turbine generators constituting the wind farm is individually controlled by the control system provided therefor, based on data about itself and data about the other wind turbine generators. Therefore, according to the present invention, control of the wind turbine generators constituting the wind farm can be changed more swiftly according to the operational condition of the wind farm.

Advantageous Effects of Invention

According to the present invention, a beneficial effect is afforded in that control of the wind turbine generators constituting the wind farm can be changed more swiftly according to the operational condition of the wind farm.

DESCRIPTION OF EMBODIMENTS

A wind-turbine-generator control system, a wind farm, and a wind-turbine-generator control method according to one embodiment of the present invention will be described below with reference to the drawings.

Figure 1:
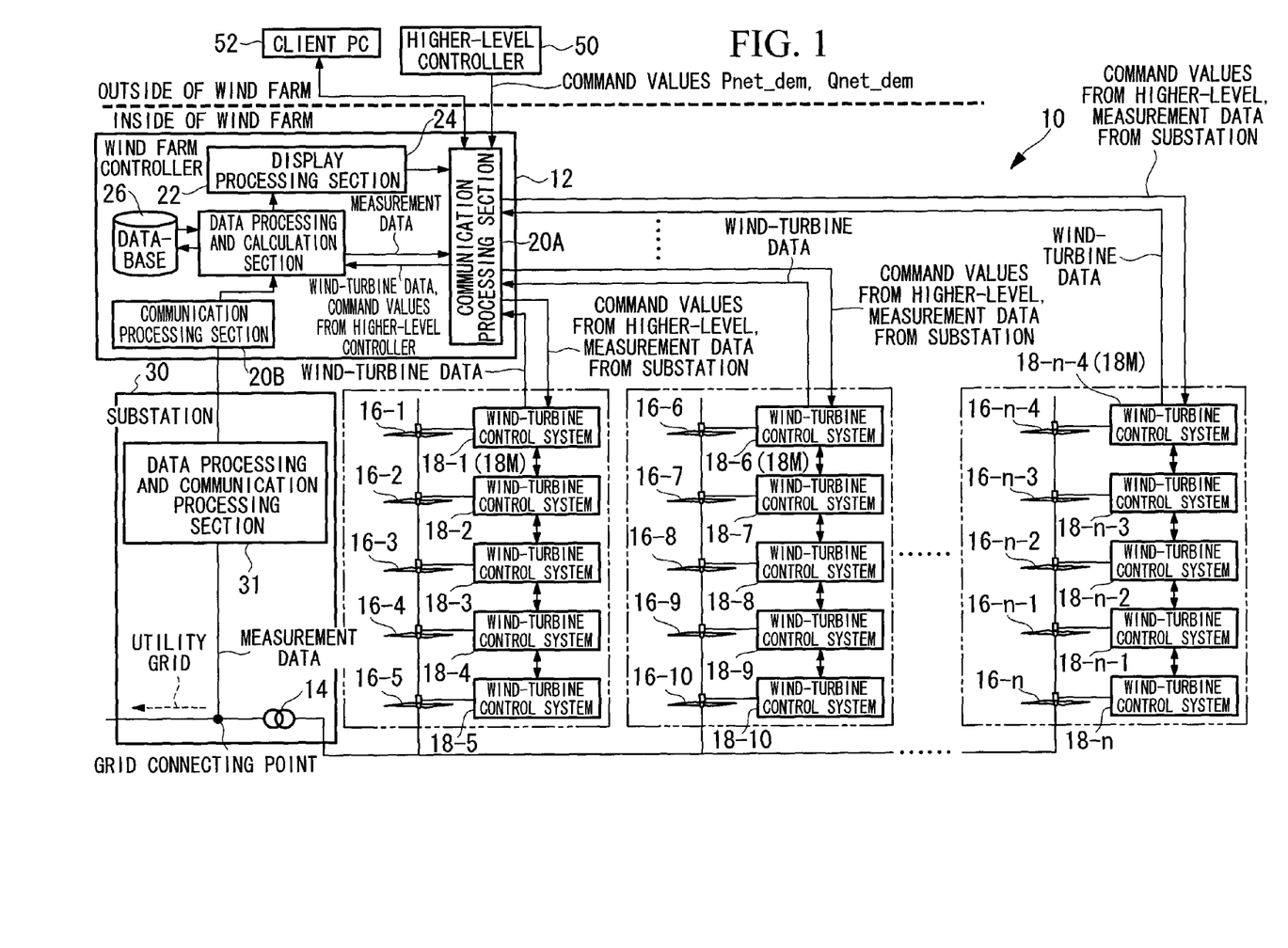
FIG. 1 is a block diagram showing the configuration of a wind farm according to an embodiment of the present invention.

FIG. 1 is a diagram showing the overall configuration of a wind farm 10 according to the embodiment of the present invention. The wind farm 10 performs overall control of the wind farm 10 and includes a wind farm controller (hereinafter, referred to as "WFC") 12 with a SCADA (supervisory control and data acquisition) configuration, for example; a plurality of wind turbine generators 16-1 to 16-n that each generate power through the rotation of a rotor provided with a plurality of blades and that are interconnected via a transformer 14; and wind-turbine control systems 18-1 to 18-n that are respectively provided for the plurality of wind turbine generators 16.

In the following description, to distinguish each of the wind turbine generators 16, any of 1 to n will be appended to the reference numeral; and, if there is no need to distinguish each of the wind turbine generators 16, 1 to n will not be appended. Further, to distinguish each of the wind-turbine control systems 18, any of 1 to n will be appended to the reference numeral; and, if there is no need to distinguish each of the wind-turbine control systems 18, 1 to n will not be appended.

The WFC 12 includes communication processing sections 20A and 20B, a data processing section 22, a display processing section 24, and a database 26.

The communication processing section 20A receives, from a higher-level controller 50 provided in an electric power company or the like, command values for the wind farm 10, such as a grid active-power command value Pnet_dem that indicates the target value of active power to be supplied to a utility grid (command value at a grid connecting point) and a grid reactive-power command value Qnet_dem that indicates the target value of reactive power to be supplied to the utility grid (command value at the grid connecting point). Also, the communication processing section 20A receives wind-turbine data about the wind turbine generators 16, sent from the wind-turbine control systems 18.

The wind-turbine data indicates the frequency of power output from the wind turbine generators 16, voltage, current, active power, reactive power, power factor, blade pitch angle, rotor rotational speed, operation mode, wind speed, wind direction, hydraulic pressure, temperature, load imposed on predetermined equipment, the presence or absence of abnormalities in various sensors, warnings, and other operational statuses. That is, the wind-turbine data indicates the operational condition of each wind turbine generator 16.

On the other hand, the communication processing section 20B receives, via a substation 30, measurement data of the frequency of power, voltage, active power, reactive power, and the like supplied from the wind farm 10 to the utility grid. The substation 30 detects the above-described measurement data at the grid connecting point by using a data processing and communication processing section 31.

The data processing section 22 performs various processes with respect to various data, such as storing in the database 26 the various data received via the communication processing sections 20A and 20B and reading various information stored in the database 26. In other words, the WFC 12 manages the wind-turbine data by using the data processing section 22 and the database 26.

Then, the communication processing section 20A sends, to the respective wind-turbine control systems 18 (in this embodiment, to master wind-turbine control systems 18M, to be described later), the command values at the grid connecting point sent from the higher-level controller 50 and the measurement data at the grid connecting point sent from the substation 30. Upon reception of the command values from the higher-level controller 50 and the measurement data from the substation 30, each of the wind-turbine control systems 18 calculates the command values for its controlled wind turbine generator 16.

The display processing section 24 applies processing to various data stored in the database 26 such that the various data can be displayed on an image display unit provided for a client terminal 52 and sends the processed various data to the client terminal 52 via the communication processing section 20A.

In this embodiment, the wind turbine generators 16 constituting the wind farm 10 are grouped into a plurality of groups. The number of wind turbine generators 16 included in one group is set to 10 or less, for example, and FIG. 1 shows an example case where the wind turbine generators 16 form groups of five.

Then, the wind-turbine control system 18 receives the wind-turbine data about the other wind turbine generators 16 that belong to the group to which the controlled wind turbine generator 16 belongs, from the other wind-turbine control systems 18. The wind turbine generator 16 controlled by the wind-turbine control system 18 is the wind turbine generator 16 having the same number at the end of the reference numeral as the wind-turbine control system 18, as shown in FIG. 1, and one wind turbine generator 16 corresponds to one wind-turbine control system 18.

Figure 2:
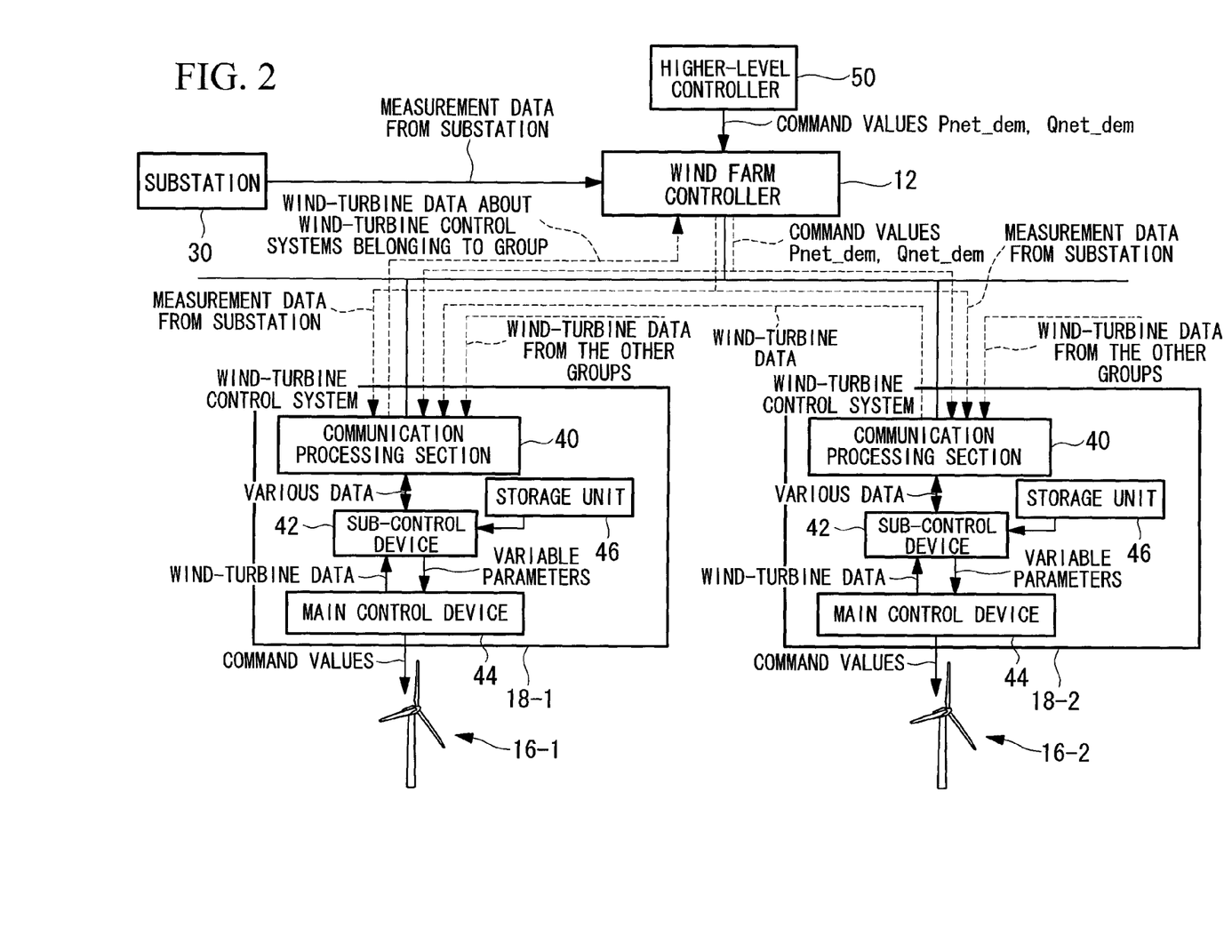
FIG. 2 is a block diagram showing the configuration of a wind-turbine control system according to the embodiment of the present invention.

FIG. 2 is a block diagram showing the configuration of the wind-turbine control system 18 of this embodiment and data flows in the wind farm.

The wind-turbine control system 18 includes a communication processing section 40, a sub-control device 42, a main control device 44, and a storage unit 46.

The communication processing section 40 sends the wind-turbine data about the controlled wind turbine generator 16 to the other wind-turbine control systems 18 and receives the wind-turbine data about the other wind turbine generators 16 sent from the other wind-turbine control systems 18. Further, the communication processing section 40 receives, via the wind farm controller 12, the command values from the higher-level controller 50 and the measurement data from the substation 30.

The communication processing section 40 of this embodiment concurrently sends (through broadcast transmission or multicast transmission) the wind-turbine data about the controlled wind turbine generator 16 to the other wind-turbine control systems 18 that belong to the same group as the controlled wind turbine generator 16. Thus, the communication processing section 40 receives the wind-turbine data about the other wind turbine generators 16 that belong to the same group.

Further, in each group, a wind-turbine control system 18 (hereinafter referred to as "master wind-turbine control system 18M") that serves to communicate with the other groups is specified. In the example shown in FIG. 1, the wind-turbine control systems 18-1, 18-6, 18- . . . , and 18-n-4 serve as the master wind-turbine control systems 18M.

Each of the master wind-turbine control systems 18M sends the wind-turbine data about the other wind turbine generators 16 that belong to the same group to the master wind-turbine control systems 18M in the other groups and receives the wind-turbine data about the wind turbine generators 16 that belong to the other groups from the master wind-turbine control systems 18M that belong to the other groups, via the communication processing section 40. Then, the master wind-turbine control system 18M sends the received wind-turbine data about the wind turbine generators 16 belonging to the other groups to the other wind-turbine control systems 18 belonging to the same group, via the communication processing section 40. As a result, the respective wind-turbine control systems 18 share the wind-turbine data about the other wind turbine generators constituting the wind farm 10.

Furthermore, the master wind-turbine control system 18M sends, to the WFC 12, the wind-turbine data about the controlled wind turbine generator 16 and the wind-turbine data about the other wind turbine generators 16 belonging to the same group. On the other hand, the WFC 12 sends, to the master wind-turbine control system 18M, the command values at the grid connecting point sent from the higher-level controller 50 and the measurement data sent from the substation 30. The master wind-turbine control system 18M sends the above-described command values and measurement data to the other wind-turbine control systems 18 belonging to the same group. As a result, since the WFC 12 sends and receives various data to and from the master wind-turbine control systems 18M, it is not necessary to send to and receive from each of the plurality of wind turbine generators 16, constituting the wind farm 10, various data used to calculate the command values for each of the wind turbine generators 16, thereby reducing the processing load of sending and receiving various data.

A time stamp indicating the date and time at which data is obtained is added to the wind-turbine data sent and received between the systems. The wind-turbine control system 18 of this embodiment sends the wind-turbine data to the other wind-turbine control systems 18 at predetermined time intervals (for example, at intervals of 0.1 seconds), as an example.

Further, communication of various data between the systems may be wired communication or wireless communication; however, for the communication, it is preferable to use a communication method advocated by NASPI (North American Synchro Phasor Initiative), a communication method specified in IEC61850, or a communication method which has a real-time characteristic and a clock synchronized characteristic like as a data distribution service for real-time systems, for example.

The sub-control device 42 executes variable-parameter arithmetic processing for calculating variable parameters used to control the controlled wind turbine generator 16, based on the command values sent from the higher-level controller 50, the measurement data sent from the substation 30, the wind-turbine data about the controlled wind turbine generator 16, and the wind-turbine data about the other wind turbine generators 16.

Then, the main control device 44 generates command values based on the variable parameters calculated by the sub-control device 42 and controls the controlled wind turbine generator 16.

On the other hand, the storage unit 46 is provided with a semiconductor storage device or a magnetic-storage device and stores various programs, such as an arithmetic program and a wind-condition prediction program, to be described later, and various data.

Next, the variable-parameter arithmetic processing executed by the sub-control device 42 will be described in detail with reference to FIG. 3.

Figure 3:
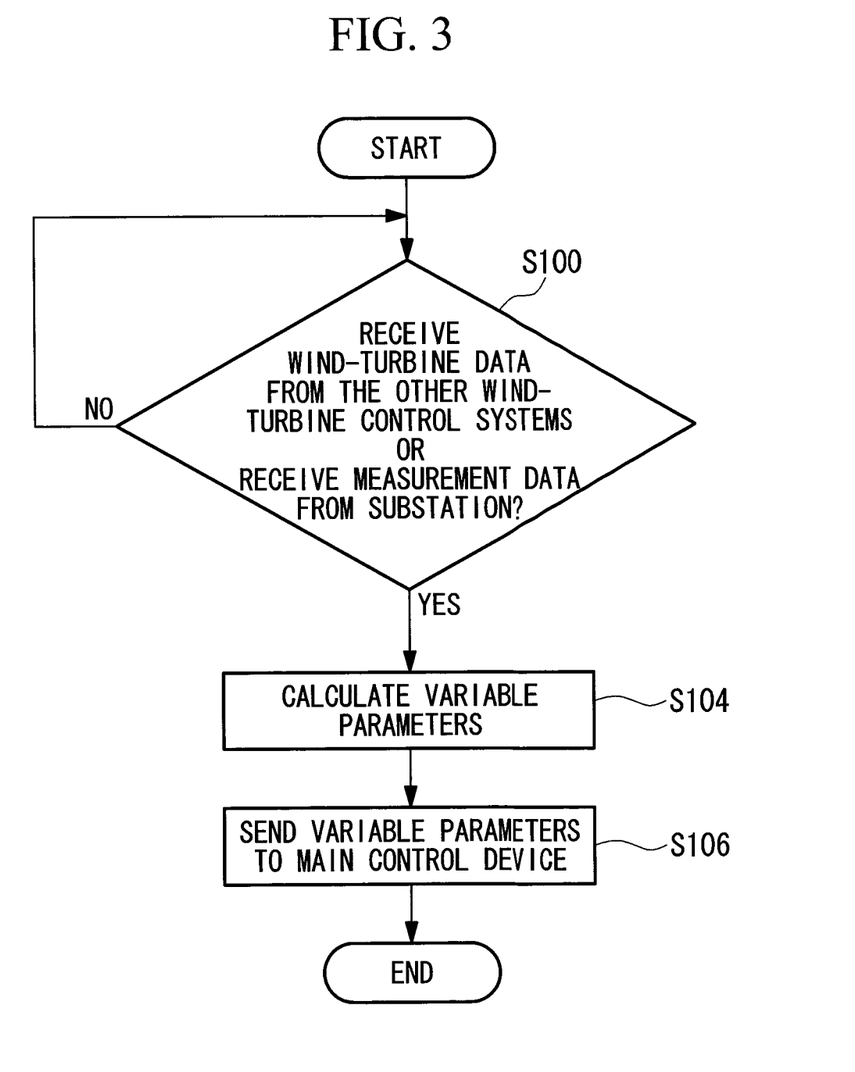
FIG. 3 is a flowchart showing the processing flow of a variable-parameter arithmetic program executed by a sub-control device according to the embodiment of the present invention.

FIG. 3 is a flowchart showing the processing flow of a variable-parameter arithmetic program executed by the sub-control device 42 when the variable-parameter arithmetic processing is performed. The variable-parameter arithmetic program is stored in advance in a predetermined area of the storage unit 46. This program is started when the operation of the wind farm 10 is started.

First, in Step 100, a waiting state continues until the wind-turbine data is received from the other wind-turbine control systems 18 or until the measurement data of power supplied to the utility grid from the whole of the wind farm 10 is received from the substation 30, and the processing flow advances to Step 104 upon reception of the wind-turbine data. Here, receiving the wind-turbine data means receiving the wind-turbine data from all the wind-turbine control systems 18 belonging to the same group and the wind-turbine data about the other wind turbine generators 16 belonging to the other groups, measured at the same time, from the master wind-turbine control systems 18M in the other groups.

The measurement data received from the substation 30 in Step 100 was measured at the same time as the other wind-turbine data.

In Step 104, variable parameters are calculated. In this step, the variable parameters for the controlled wind turbine generator 16 are calculated based on the wind-turbine data about the controlled wind turbine generator 16, the wind-turbine data about the other wind turbine generators 16 that belong to the same group, and the wind-turbine data about the other wind turbine generators 16 that belong to the other groups, by referring to (for example, by feeding back) the measurement data received from the substation 30.

When the variable parameters are calculated, the default value in the operation mode, the default values of operation-mode parameters, information on combinations of machine numbers of grouped wind turbine generators 16, information on the wind conditions in the wind farm 10 (a wind-condition map and a wind-condition prediction map, to be described later; specifically, wind-condition predicted values, wind-condition measured values, and the errors between the predicted values and the measured values), for example, may be used, in addition to the wind-turbine data about each wind turbine generator 16. These pieces of information are common to each wind turbine generator 16 and are stored in the storage unit 46.

Examples of the above-described operation mode include a normal operation mode, a frequency-support priority mode, a voltage-support priority mode, a columnar-wind curtailment mode, and a power curtailment mode.

The frequency-support priority mode is an operation mode for recovering from a decreased grid frequency. The voltage-support priority mode is an operation mode for recovering from a decreased grid voltage. The columnar-wind curtailment mode is an operation mode for avoiding an influence caused by a turbulent wake flow of wind coming from other wind turbine generators 16 located upwind. The power curtailment mode is an operation mode for limiting the power output from the wind turbine generator 16 by specifying the time and power.

The operation-mode parameters include a frequency deviation, a voltage deviation, a columnar-wind stopping condition, output-power limit settings, a ramp rate setting, a droop setting, a deadband setting, and the like.

The frequency deviation is a permissible amount of deviation of frequency output from a power generation station (power generators), required by the guidelines and the grid requirements, both of which are specified by an electric supply company, with respect to the standard frequency (50 Hz or 60 Hz, different depending on the area) of the utility grid. The voltage deviation is a permissible amount of deviation of voltage at the time of output (expressed, for example, as 0.9 p.u or 1.1 p.u), required by the guidelines and the grid requirements, both of which are specified by the electric supply company, when the rated value of the rated voltage of the utility grid side (different depending on the wind farm and the area) and the rated value of the rated power voltage of the wind turbine generator 16 (different depending on the wind-turbine generator type) are set to 1 p.u. The output-power limit settings mean control setting amounts of active power and reactive power output from the wind turbine generator 16, which are used to maintain the grid frequency and the grid voltage as specified in the guidelines and within the range of the requirements (within the permissible deviation). The ramp rate part the rate of a change in power until the power is controlled to the target value when the output power is limited. The droop setting means the permanent speed variation obtained from the characteristic curve of the generator output and the generator frequency. The deadband setting means a permissible frequency range with respect to the standard frequency (for example, 60 Hz in the United States of America), in a utility grid for which the primary frequency response (PFR) is required. For example, when the deadband is set to 0.036 Hz, the permissible frequency range is from 59.964 Hz to 60.036 Hz.

The variable parameters calculated in this step include a rotor optimum rotational speed, a blade pitch angle, an output value, a nacelle turning direction, and an output-power limitation amount (deloading amount) used when the output power is limited.

In this step, based on the wind-turbine data about the other wind turbine generators 16 belonging to the same group and the other groups, the variable parameters are calculated for only the wind turbine generators 16 in each group such that distribution-loss minimization, voltage-drop minimization, and load minimization are optimized. On the other hand, in this step, variable parameters that also affect the operation of the other wind turbine generators 16, such as an operation command value for halting the operation and a switch command value for switching the operation mode, are calculated by also using the wind-turbine data about the wind turbine generators 16 belonging to the same group and the other groups.

In the next Step 106, the variable parameters calculated in Step 104 are sent to the main control device 44, and this program ends. In the main control device 44, command values used for controlling the wind turbine generator 16 are generated based on the received variable parameters, and the wind turbine generator 16 is controlled based on the generated command values.

In this way, the wind-turbine control system 18 controls the controlled wind turbine generator 16 according to the operational statuses of the other wind turbine generators 16, in other words, according to the operational status of the wind farm 10, without waiting for processing to be performed in the WFC 12.

Further, since the wind-turbine control system 18 is provided for each wind turbine generator 16, control of the wind turbine generator 16 is unlikely to be delayed, compared with a case where the WFC 12 generates the command values used for controlling each wind turbine generator 16.

Furthermore, in the wind farm 10 of this embodiment, wind-condition prediction processing is performed to predict the wind conditions in the wind farm 10.

Figure 4:
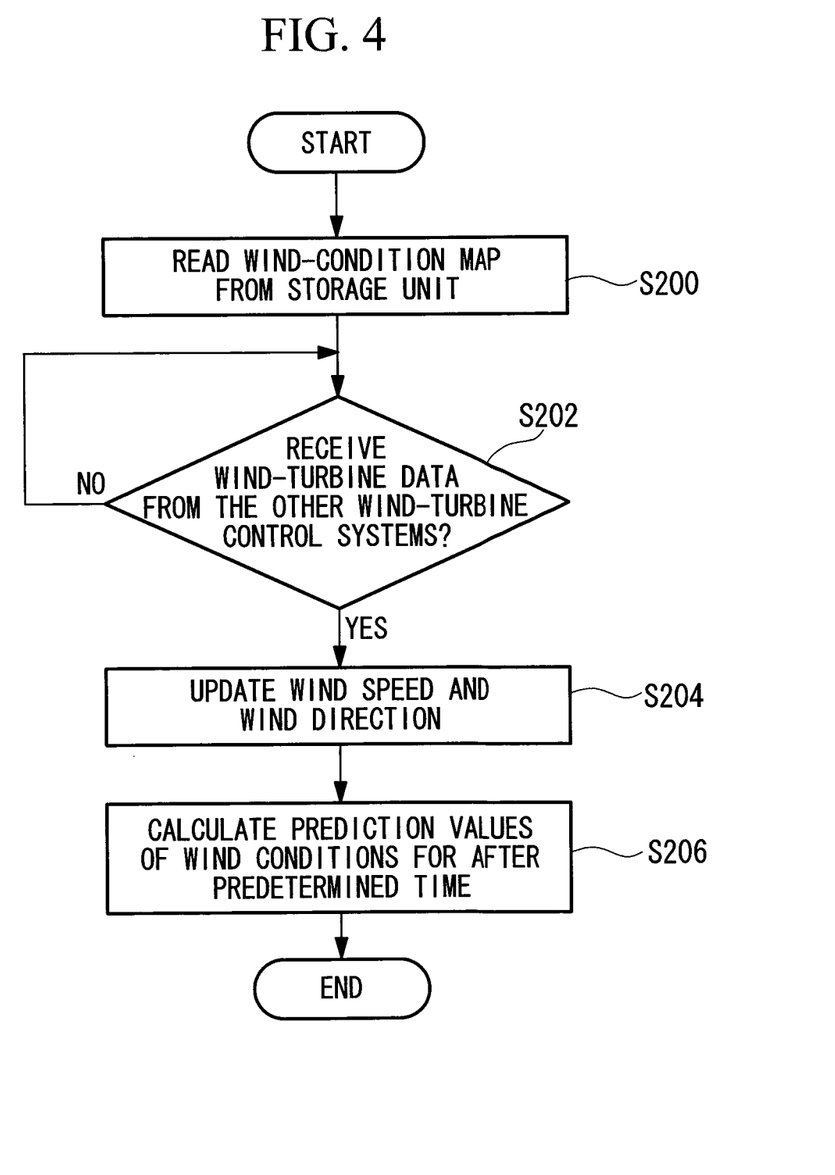
FIG. 4 is a flowchart showing the processing flow of a wind-condition prediction program executed by the sub-control device according to the embodiment of the present invention.

FIG. 4 is a flowchart showing the processing flow of a wind-condition prediction program executed by the sub-control device 42 when the wind-condition prediction processing is performed. The wind-condition prediction program is stored in advance in a predetermined area of the storage unit 46. This program is started when the operation of the wind farm 10 is started. The wind-condition prediction processing may be performed in each wind-turbine control system 18 or may be performed only in a predetermined wind-turbine control system 18.

First, in Step 200, a wind-condition map is read from the storage unit 46. When a required wind-condition map is not stored in the storage unit 46, a wind-condition map stored in another wind-turbine control system 18 is read from that wind-turbine control system 18.

In the next Step 202, a waiting state continues until the wind-turbine data is received from the other wind-turbine control systems 18, and the processing flow advances to Step 204 upon reception of the wind-turbine data. Here, receiving the wind-turbine data means receiving the wind-turbine data from all the wind-turbine control systems 18 belonging to the same group and the wind-turbine data about the other wind turbine generators 16 belonging to the other groups, measured at the same time, from the master wind-turbine control systems 18M in the other groups.

In Step 204, information about the wind speed and the wind direction indicated by the wind-condition map read in Step 200 is updated based on wind-turbine location table data in which the latitude, the longitude, and the altitude of the installation location of each wind turbine generator 16 are associated with the machine number for identifying the wind turbine generator 16 and based on the wind-turbine data about each wind turbine generator 16, and the updated wind-condition map is stored in the storage unit 46. The wind-turbine location table data is stored in the storage unit 46 in advance.

In a specific example of the wind-condition map, the machine number of each wind turbine generator 16, the latitude, the longitude, the altitude, the wind speed, and the measurement date and time of the wind speed and the wind direction are associated with each other. The wind-condition map may be generated at predetermined time intervals (for example, at intervals of 0.1 seconds).

Figure 5:
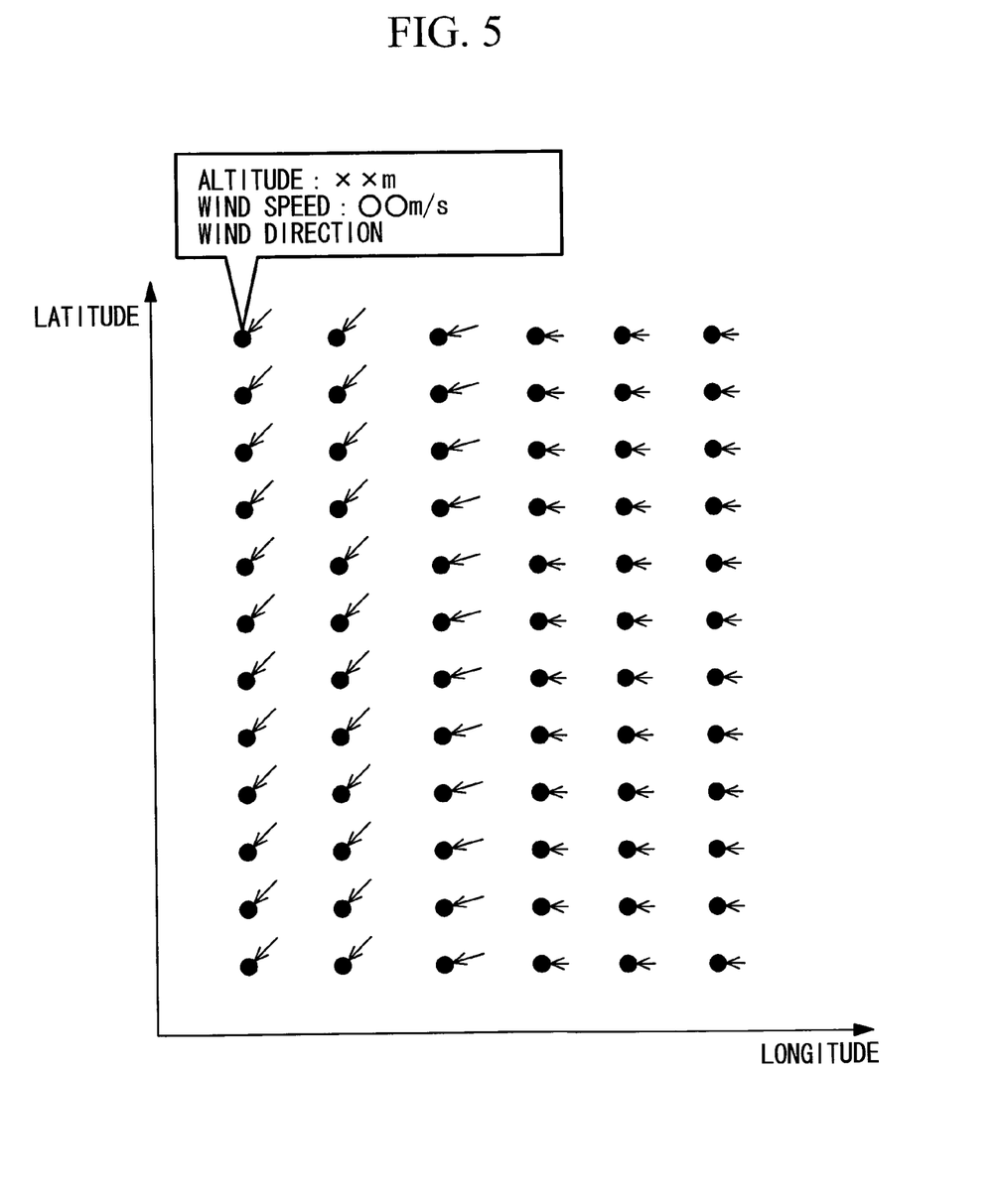
FIG. 5 is a diagram showing an example wind-condition map according to the embodiment of the present invention.

Furthermore, as shown in one example of FIG. 5, for example, when the wind conditions in the wind farm 10 are displayed on the image display unit of the client terminal 52, the wind-condition map may be processed such that the wind conditions (the distribution of the wind direction and the wind speed) can be visually judged with ease, such as indicating the latitude and the longitude of each wind turbine generator 16 by a black dot, indicating the wind direction by the direction of an arrow added to the black dot, and indicating the wind speed by the length of the arrow.

In the next Step 206, wind conditions in the wind farm 10 a predetermined time later (for example, 0.2 seconds later) are calculated, thereby obtaining prediction values of the wind conditions in the wind farm 10 for after the predetermined time. Specifically, for example, a plurality of past wind-condition maps obtained at the predetermined time intervals and stored in the storage unit 46 are read, and the prediction values of the wind conditions in the wind farm 10 for after the predetermined time are calculated based on the wind speeds and the wind directions indicated by the read wind-condition maps and based on the deviation of the actual measurement from the prediction at the present location.

Then, in this step, a wind-condition prediction map similar to the above-described wind-condition map is generated based on the calculated wind-condition prediction values, and this program ends. When the wind conditions for after the predetermined time indicated by the wind-condition prediction map are actually measured, the measured value and the error between the measured value and the prediction value may be newly added to the wind-condition prediction map. This error is utilized for the next prediction.

When the wind-condition prediction map is generated in a predetermined wind-turbine control system 18, the wind-condition prediction map is sent to the other wind-turbine control systems 18 that belong to the same group as the predetermined wind-turbine control system 18 and to the master wind-turbine control systems 18M in the other groups.

Each wind-turbine control system 18 calculates the variable parameters for controlling the wind turbine generator 16 by also using the received wind-condition prediction map. Thus, each wind-turbine control system 18 generates command values, such as a pitch-angle command value and a rotational-speed command value, for after the predetermined time indicated by the wind-condition prediction map. Therefore, according to the ever-changing wind conditions in the wind farm, the wind-turbine control system 18 can change the control of the wind turbine generator 16 more swiftly and can perform efficient operation thereof.

Further, because the wind-condition map can be easily generated by reading the wind speed and the wind direction from the wind-turbine data, each wind-turbine control system 18 may generate the wind-condition map only, without generating the wind-condition prediction map, and may calculate the variable parameters for controlling the wind turbine generator 16 by also using the generated wind-condition map.

Figure 6:
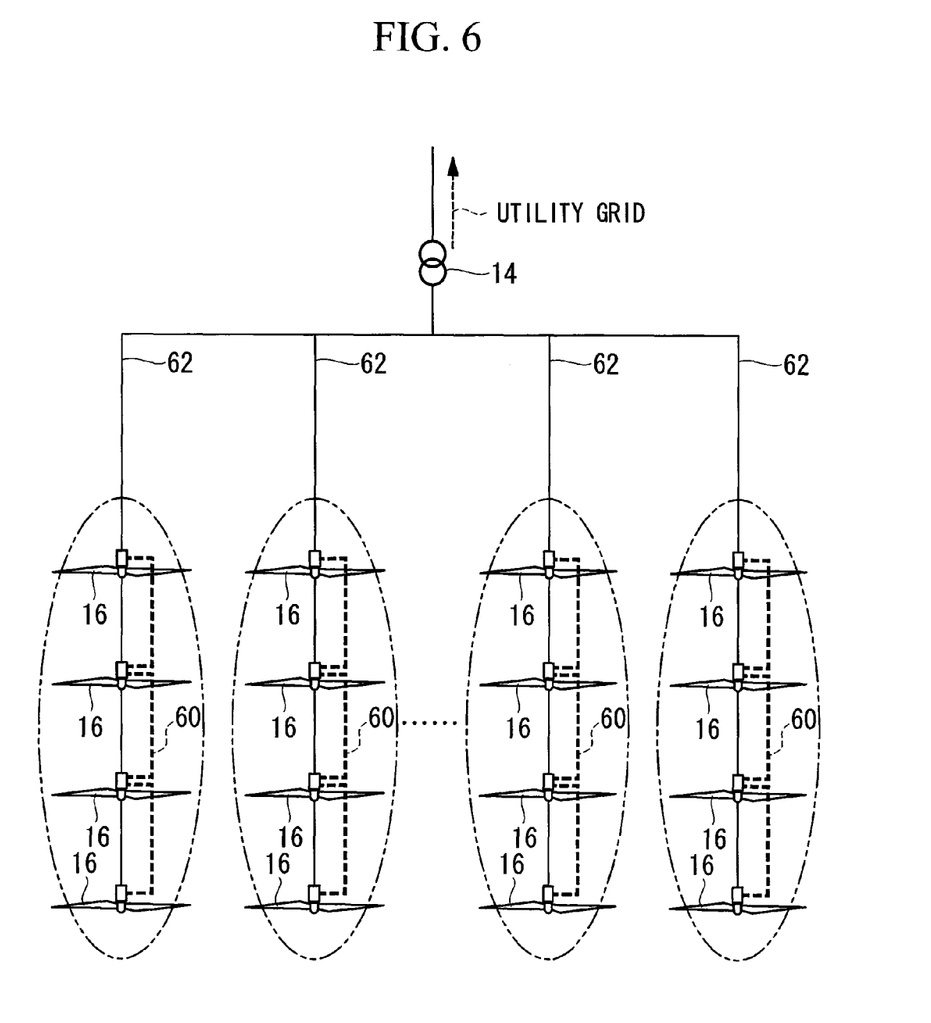
FIG. 6 is a diagram schematically showing a case where wind turbine generators are grouped by using a power line as a criterion, in the wind farm according to the embodiment of the present invention.
Figure 7:
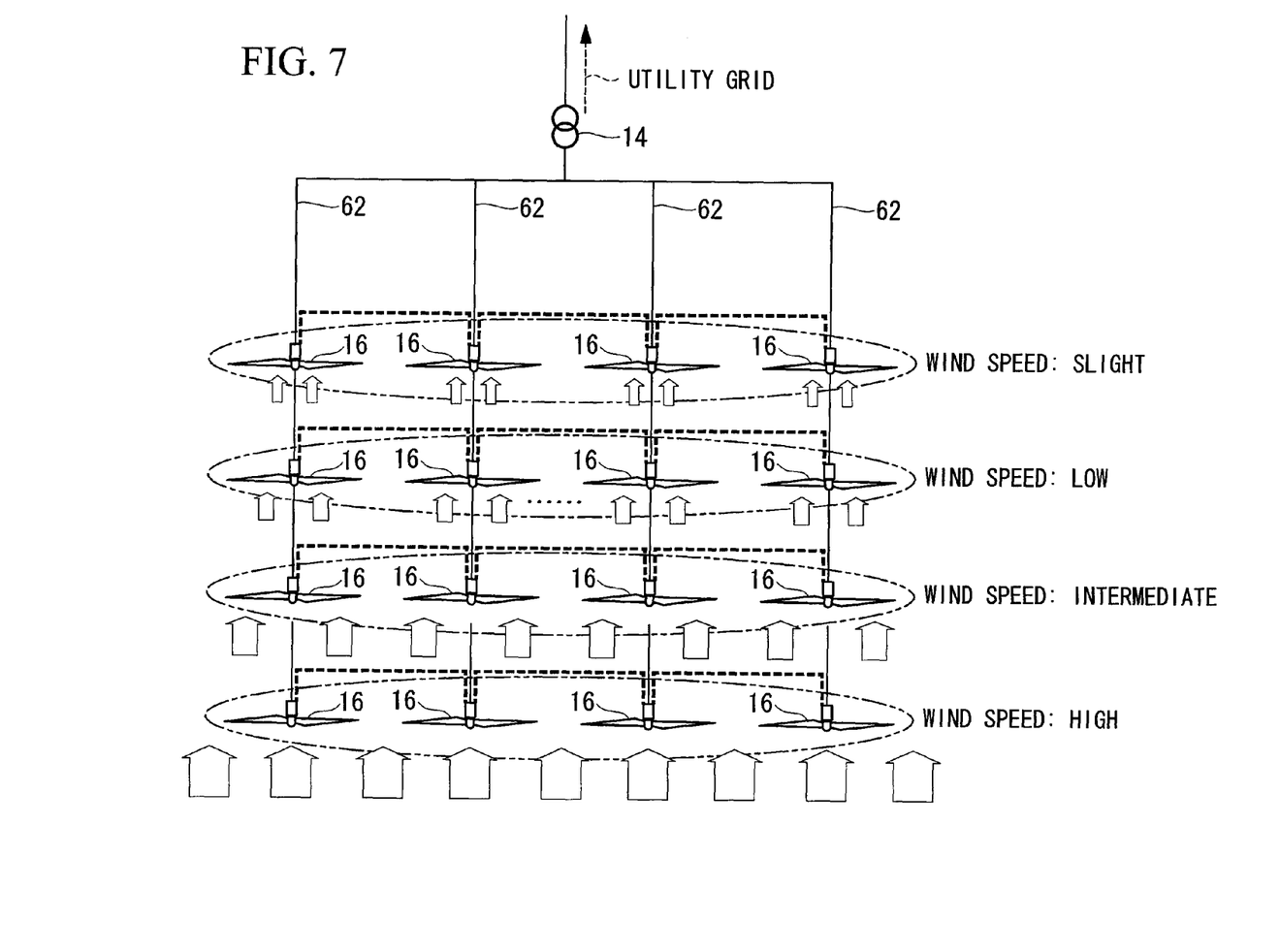
FIG. 7 is a diagram schematically showing a case where the wind turbine generators are grouped by using the wind speed as a criterion, in the wind farm according to the embodiment of the present invention.
Figure 8:
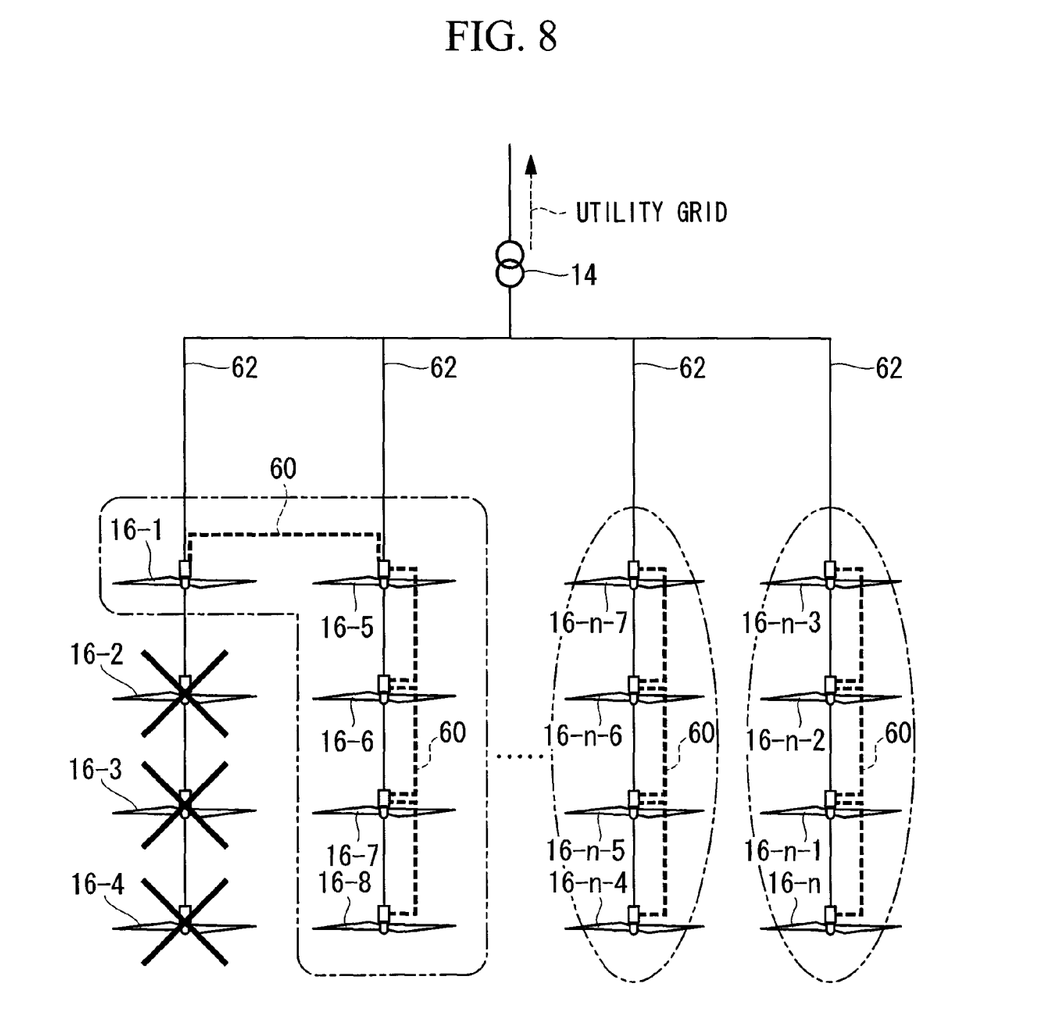
FIG. 8 is a diagram schematically showing a case where the wind turbine generators are grouped when breakdowns occur in some wind turbine generators in the wind farm according to the embodiment of the present invention.

Next, examples of grouping the wind turbine generators 16 will be described with reference to FIGS. 6 to 8. The plurality of wind turbine generators 16 constituting the wind farm 10 of this embodiment are grouped into a plurality of groups based on a predetermined criterion. The predetermined criterion can be changed according to the wind conditions and the operational statuses of the wind turbine generators 16. In FIGS. 6 to 8, dashed lines 60 each connecting the respective wind turbine generators 16 indicate communication lines used for transmission and reception of the wind-turbine data in the respective groups.

FIG. 6 shows a case where the wind turbine generators 16 are grouped by using power lines 62 that connect the respective wind turbine generators 16, as a criterion for grouping. The wind turbine generators 16 that are connected by the same power line 62 form one group. In this way, when the power lines 62 are used as the criterion for grouping, it is easy to deal with the inspection of each power line 62, the occurrence of an abnormality in the power line 62, such as disconnection, and the occurrence of abnormalities in the wind turbine generators 16 connected by the power line 62, such as simultaneous breakdowns.

FIG. 7 is a diagram schematically showing a case where the wind turbine generators 16 are grouped by using the magnitude of the wind speed as a criterion. The wind turbine generators 16 that have similar wind speeds in their vicinities form one group. In this case, it is easy to control the power adjustment of the wind turbine generators 16 according to the wind speeds, for example, by setting the wind turbine generators 16 that belong to a group with higher wind speeds to the frequency-support priority mode, in which operation is performed while more active power is being limited, in order to deal with a decreased grid frequency, and by setting the wind turbine generators 16 that belong to a group with lower wind speeds to the voltage-support priority mode, in which reactive power can be supplied to the utility grid, in order to deal with a decreased grid voltage.

FIG. 8 is a diagram schematically showing a case where the wind turbine generators are grouped by using the presence or absence of breakdowns in the wind turbine generators, as a criterion for grouping. In the example case shown in FIG. 8, the wind turbine generators 16 first form groups of four, as shown in FIG. 6; however, when the wind turbine generators 16-2 to 16-4 have breakdowns, the wind turbine generator 16-1 is incorporated into the group of wind turbine generators 16-5 to 16-8 because it is inefficient to form one group only of the wind turbine generator 16-1 in terms of the power adjustment control.

The criterion for grouping is not limited to the above-described criteria, and another criterion may be used, such as the wind direction, the magnitude of power output from each wind turbine generator 16, and the magnitude of the load imposed on each wind turbine generator 16.

The criterion for grouping can be changed according to the wind conditions or the operational states of the wind turbine generators 16.

Specifically, it is determined whether the criterion for grouping needs to be changed, based on grouping information (the current criterion for grouping and the machine numbers of grouped wind turbine generators 16), the wind-turbine data about each wind turbine generator 16, and the wind-condition information. This determination is made by, for example, a predetermined wind-turbine control system 18 (for example, the master wind-turbine control system 18M). Then, when it is determined that the criterion for grouping needs to be changed, the above-described wind-turbine control system 18 generates information indicating a new criterion for grouping and the combinations of the machine numbers of the wind turbine generators 16 to be grouped, and information indicating the machine numbers of the master wind-turbine control systems 18M in the respective groups and the operation modes of the respective groups, and sends them to the other wind-turbine control systems 18. Since the above-described pieces of information are also sent to the WFC 12, the WFC 12 can recognize the master wind-turbine control systems 18M, to and from which various information is sent and received.

As described above, the wind-turbine control system 18 of this embodiment is provided for each of the plurality of wind turbine generators 16 constituting the wind farm 10, sends the wind-turbine data about the controlled wind turbine generator 16 to the wind-turbine control systems 18 provided for the other wind turbine generators 16, and receives, from the wind-turbine control systems 18 provided for the other wind turbine generators 16, the wind-turbine data about the other wind turbine generators 16. Then, the wind-turbine control system 18 controls the controlled wind turbine generator 16 based on the wind-turbine data about the controlled wind turbine generator 16 and the wind-turbine data about the other wind turbine generators 16; therefore, it is possible to more swiftly change the control of the wind turbine generators constituting the wind farm according to the operational condition of the wind farm.

Furthermore, since the control of the wind turbine generators 16 does not require calculating the command values in the WFC 12, even when the WFC 12 has a breakdown, power generation in the wind farm 10 can be maintained.

Furthermore, the wind turbine generators 16 of this embodiment are grouped into a plurality of groups based on a predetermined criterion.

Then, the wind-turbine control system 18 of this embodiment receives the wind-turbine data about the other wind turbine generators 16 that belong to the group to which the controlled wind turbine generator 16 belongs and controls the controlled wind turbine generator 16 based on the wind-turbine data about the controlled wind turbine generator 16 and the above-described wind-turbine data received; therefore, it is possible to change the control of the wind turbine generators 16 constituting the wind farm 10 more swiftly and efficiently.

Furthermore, the wind-turbine control system 18 controls the controlled wind turbine generator 16 based on the distribution of the wind direction and the wind speed in the wind farm, included in the wind-turbine data about the wind turbine generators 16; therefore, it is possible to more swiftly change the control of the wind turbine generators according to the ever-changing wind conditions in the wind farm.

Furthermore, since the WFC 12 receives the wind-turbine data about the wind turbine generators 16 from the master wind-turbine control systems 18M, the WFC 12 does not need to receive the wind-turbine data from all of the plurality of wind turbine generators 16 constituting the wind farm 10, thereby reducing the processing load of sending and receiving various data in the WFC 12.

A description has been given of the present invention by using the embodiment, but the technical scope of the present invention is not limited to the scope described above in the embodiment. Various modifications or improvements can be added to the above-described embodiment without departing from the gist of the invention, and those modifications or improvements are also encompassed in the technical scope of the present invention.

For example, in the above-described embodiment, a description has been given of a case where the plurality of wind turbine generators 16 constituting the wind farm 10 are grouped into a plurality of groups; however, the present invention is not limited thereto, and a configuration in which the wind turbine generators are not grouped may be used.

Furthermore, in the above-described embodiment, a description has been given of a case where the wind-turbine control system 18 generates the wind-condition map and the wind-condition prediction map from the wind speed and the wind direction at each wind turbine generator 16; however, the present invention is not limited thereto, and a configuration may be used in which the wind-turbine control system 18 generates the wind-condition map and the wind-condition prediction map from either one of the wind speed and the wind direction at each wind turbine generator 16. Furthermore, from the altitude and temperature data, air density may be added to the wind-condition map and the wind-condition prediction map.

Furthermore, in the above-described embodiment, a description has been given of a case where each wind-turbine control system 18 receives, from the substation 30, the measurement data detected at the grid connecting point; however, the present invention is not limited thereto, and, for example, a configuration may be used in which each wind-turbine control system 18 receives the measurement data from the substation 30 via the WFC 12 and the master wind-turbine control system 18M.

REFERENCE SIGNS LIST

10 wind farm
12 WFC (wind farm controller)
16 wind turbine generator
18 wind-turbine control system
40 communication processing section
42 sub-control device
44 main control device

The invention claimed is:

1. A wind farm, comprising:
a plurality of wind turbine generators that are grouped into a plurality of groups based on a predetermined criterion; and
a management device that manages data about the plurality of wind turbine generators,
wherein each of the plurality of wind turbine generators includes a control system,
wherein the control system includes:
  a transmission part for transmitting data about a controlled wind turbine generator among the plurality of wind turbine generators to other wind turbine generators;
  a reception part for receiving data about the other wind turbine generators transmitted from the other wind turbine generators that belong to a group to which the controlled wind turbine generator belongs; and,
  a control part for controlling the controlled wind turbine generator based on the data about the controlled wind turbine generator and the data received by the reception part about the other wind turbine generators that belong to the group to which the controlled wind turbine generator belongs;
wherein the control system changes the criterion according to wind conditions or operational states of the plurality of wind turbine generators, and
wherein the transmission part included in a predetermined control system, among the control systems provided for the plurality of wind turbine generators, transmits, to the management device, the data about a wind turbine generator controlled by the predetermined control system and the data received by the reception part about the other wind turbine generators that belong to the group to which the controlled wind turbine generator belongs.

2. A wind farm, comprising:
a plurality of wind turbine generators that are grouped into a plurality of groups based on a predetermined criterion, and
a management device that manages data about the plurality of wind turbine generators,
each of the plurality of wind turbine generators includes a control system,
wherein the control system includes:
  a transmission part for transmitting data about a controlled wind turbine generator among the plurality of wind turbine generators to other wind turbine generators;
  a reception part for receiving data about the other wind turbine generators transmitted from the other wind turbine generators that belong to a group to which the controlled wind turbine generator belongs; and,
  a control part for controlling the controlled wind turbine generator based on the data about the controlled wind turbine generator and the data received by the reception part about the other wind turbine generators that belong to the group to which the controlled wind turbine generator belongs;
wherein the control system changes the criterion according to wind conditions or operational states of the plurality of wind turbine generators
wherein the data about the plurality of wind turbine generators contains a wind speed and a wind direction at each of the plurality of wind turbine generators,
wherein the control part generates a distribution of at least one of the wind speed and the wind direction in the wind farm, from the data about the controlled wind turbine generator and the data received by the reception part about the other wind turbine generators that belong to the group to which the controlled wind turbine belongs, and controls the controlled wind turbine generator based on the generated distribution, and
wherein the transmission part included in a predetermined control system, among the control systems provided for the plurality of wind turbine generators, transmits, to the management device, the data about a wind turbine generator controlled by the predetermined control system and the data about the other wind turbine generators received by the reception part.

* * * * *